US008997782B2

(12) United States Patent
Bostwick et al.

(10) Patent No.: US 8,997,782 B2
(45) Date of Patent: Apr. 7, 2015

(54) INLET CONTROL VALVES FOR USE WITH FUEL DELIVERY SYSTEMS

(75) Inventors: Christopher C. Bostwick, Rockford, MI (US); Sean Whelan, Grand Ledge, MI (US); Gary Lee Dunkle, Connersville, IN (US)

(73) Assignees: Brunswick Corporation, Lake Forest, IL (US); Stant USA Corp., Connersville, IN (US)

( * ) Notice: Subject to any disclaimer, the term of this patent is extended or adjusted under 35 U.S.C. 154(b) by 334 days.

(21) Appl. No.: 13/242,882

(22) Filed: Sep. 23, 2011

(65) Prior Publication Data

US 2012/0211689 A1 Aug. 23, 2012

Related U.S. Application Data

(60) Provisional application No. 61/386,250, filed on Sep. 24, 2010.

(51) Int. Cl.
*F16K 15/03* (2006.01)
*F02M 37/00* (2006.01)

(52) U.S. Cl.
CPC ................................ *F02M 37/0076* (2013.01)

(58) Field of Classification Search
USPC ................ 137/527, 527.2, 527.4, 515, 515.5, 137/513.5; 285/921, 305, 319, 363, 405
See application file for complete search history.

(56) References Cited

U.S. PATENT DOCUMENTS 2,247,773 A * 7/1941 Dunn ........................ 137/527.4
2,482,198 A * 9/1949 Melichar ...................... 137/527
2,532,067 A * 11/1950 La Bour .................... 137/515.5
2,588,775 A * 3/1952 Smolensky ................ 137/515.5
2,602,631 A * 7/1952 Eickmeyer ................. 137/515.5
2,766,765 A * 10/1956 Bolanowski et al. ...... 137/515.5
2,969,492 A * 1/1961 Wheatley ................... 137/527.4
3,588,149 A * 6/1971 Demler, Sr. et al. .......... 285/110
4,369,808 A * 1/1983 Hagman .................... 137/515.5
4,602,654 A * 7/1986 Stehling et al. ............ 137/515.5
4,631,001 A * 12/1986 Keech ........................ 137/515.5
4,790,567 A * 12/1988 Kawano et al. ................. 285/24
4,809,738 A * 3/1989 Scaramucci ............... 137/515.7
5,044,396 A * 9/1991 Daudet et al. ............. 137/515.5
5,113,900 A * 5/1992 Gilbert ...................... 137/515.5
5,215,339 A * 6/1993 Morse et al. .................. 285/256
5,295,506 A * 3/1994 Smith ........................ 137/515.5

(Continued)

FOREIGN PATENT DOCUMENTS

EP 0223495 A1 * 5/1987
WO WO2010/061734 A1 * 6/2010

*Primary Examiner* — John Rivell

(74) *Attorney, Agent, or Firm* — Hanley, Flight & Zimmerman, LLC

(57) ABSTRACT

Inlet control valves for use with fuel delivery systems are described. An example inlet control valve includes a first body portion having a first coupling to define an inlet of the control valve and one of a plurality of fasteners or a plurality of slots opposite the inlet. A second body portion coupled to the first body portion to define a fluid flow passageway, where the second body portion has a second coupling to define an outlet of the control valve and the other one of the plurality of fasteners or the plurality of slots opposite the outlet. The first plurality of slots receives the first plurality of fasteners when the first body portion is coupled to the second body portion. A valve is pivotally coupled relative to the first and second body portions to control fluid flow through the passageway.

23 Claims, 11 Drawing Sheets

(56) References Cited

U.S. PATENT DOCUMENTS 6,203,071 B1 * 3/2001 Kingsford et al. .............. 285/18
6,234,195 B1 * 5/2001 Kippe et al. ............... 137/493.3
6,240,957 B1 * 6/2001 Hattori ....................... 137/527.6
6,722,633 B2 * 4/2004 Kawai ........................... 251/305
6,889,707 B2 * 5/2005 Nicolino .................... 137/513.5
7,128,091 B2 * 10/2006 Istre, Jr. ..................... 137/515.5
7,147,001 B2 12/2006 Gamble
7,520,294 B2 * 4/2009 German et al. ............... 137/300
8,403,001 B2 * 3/2013 Ishizaka ........................ 137/592
2004/0231728 A1 * 11/2004 Martin et al. ................. 137/527

* cited by examiner

INLET CONTROL VALVES FOR USE WITH FUEL DELIVERY SYSTEMS

CROSS REFERENCE TO RELATED APPLICATION

This patent claims the benefit of U.S. Provisional Patent Application Ser. No. 61/386,250, filed on Sep. 24, 2010, entitled INLET CONTROL VALVES FOR USE WITH FUEL DELIVERY SYSTEMS, which is incorporated herein by reference in its entirety.

FIELD OF THE DISCLOSURE

The present disclosure relates generally to fuel delivery systems and, more particularly, to inlet control valves for use with fuel delivery systems.

BACKGROUND

A fuel system of a marine craft typically includes a fuel filler tube coupled to a fuel tank. The filler tube may include a deckfill that is adapted for mounting to a deck of the marine craft such as, for example, a deck of a boat. The deckfill includes an opening for receiving a nozzle such as, for example, a nozzle of a fuel pump, etc. During a fuel filling operation, as the fuel tank is being filled via the deck fill, the fuel vapors in the fuel tank are displaced and vented from the fuel tank via a vent line and/or via the filler tube to the atmosphere. However, such displacement of the fuel vapors from the fuel tank may cause the fuel vapors to carry liquid fuel through the filler tube line and out to the atmosphere or the environment through the deckfill apparatus. As a result, the air and/or fuel vapors carry liquid fuel from the fuel tank to, for example, the deck of the marine craft via the filler tube, thereby causing liquid fuel spillage.

Additionally or alternatively, some deckfill apparatus include means for venting the fuel vapors inside the fuel tank to the atmosphere. However, government agencies (e.g., the Environmental Protection Agency) have enacted regulations to limit the amount of evaporative emissions that can be legally emitted by boats and other marine vehicles during operation and/or non-operation of the marine vehicles. More specifically, government regulations (e.g., title 40 of the Code of Federal Regulations) have been enacted to control diurnal evaporative emissions of marine vehicles. In particular, these regulations limit the amount of evaporative diurnal emissions that a marine vehicle may permissibly emit during a diurnal cycle (e.g., periods of non-operation). Thus, a deckfill apparatus having venting means may allow diurnal emissions via a fuel line of the fuel delivery system. When the pressure in the fuel tank increases during a diurnal cycle, the fuel vapors may fill the fuel line and pass to the atmosphere via the venting means of the deckfill apparatus.

DETAILED DESCRIPTION

In general, the example fuel delivery systems described herein may be used with marine crafts or vehicles. The example fuel delivery systems described herein include enhanced or improved inlet control valve apparatus having a multi-piece valve body that is snap-fit together after a flow control apparatus is coupled (e.g., pivotally coupled) within a fluid flow passageway of the valve body. The multi-piece valve body is snap-fit (e.g., via an arbor press) to eliminate welding (e.g., sonic welding) that is otherwise required with conventional inlet control valves. A seal (e.g., an O-ring) is disposed between the multi-piece valve body to substantially reduce or prevent leakage between the multi-piece valve body. Further, the example inlet control valve apparatus described herein substantially reduce or prevent fuel spillage via a deckfill opening during an overfilling condition or event.

Additionally or alternatively, the example inlet control valves provide modularity by receiving different types of flow control apparatus based on the type of fuel delivery system being used. For example, a first flow control apparatus may be provided to allow venting of fuel vapors and/or air across the flow control member, while preventing liquid fuel from flowing across flow control apparatus during an overfill condition. Another example flow control apparatus described herein provides a relatively tight seal to substantially reduce or prevent diurnal emissions across the flow control apparatus and redirect the fuel vapors to a venting system of the fuel delivery system.

As used herein, a "fluid" includes, but is not limited to, a liquid such as fuel (e.g., gasoline), a vapor such as fuel vapor (e.g., gasoline vapor), a gas (e.g., air) and/or any combination or mixture thereof.

Figure 1:
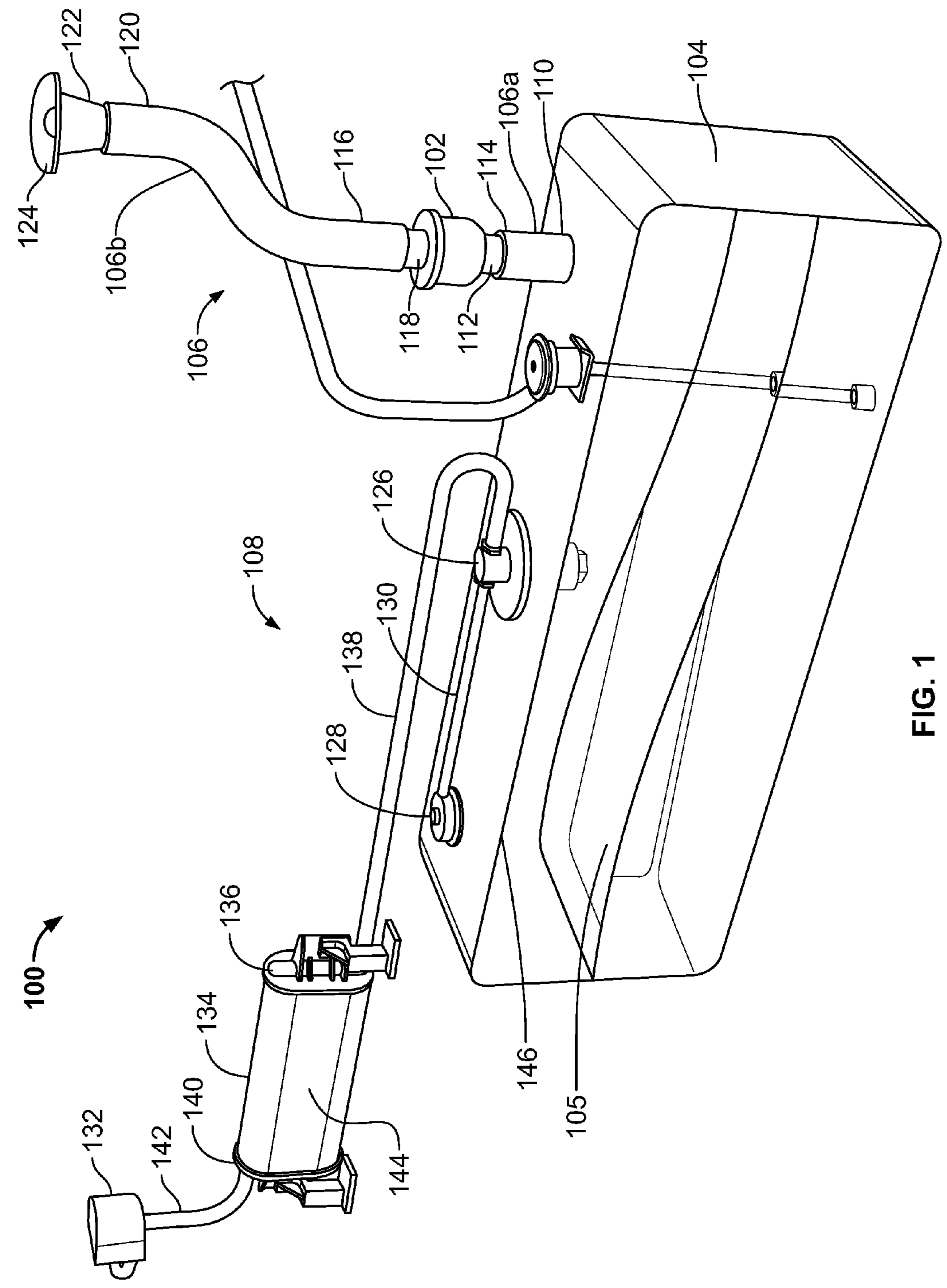
FIG. 1 is schematic representation of an example fuel tank system implemented with an example inlet control valve described herein.

FIG. 1 illustrates an example marine fuel delivery system 100 implemented with an example inlet control valve 102 described herein. The example fuel delivery system 100 includes a fuel tank 104 for storing fuel 105 (e.g., gasoline, diesel fuel, etc.), a filler tube 106, and a venting system 108 to vent the fuel tank 104. The inlet control valve 102 is in fluid communication with the filler tube 106 and the fuel tank 104. In particular, a first filler tube portion 106*a* is coupled to the fuel tank 104 at a first end 110 (e.g., via a fuel coupling) and is coupled to a first side, opening or outlet 112 of the inlet control valve 102 at a second end 114. A first end 116 of a second filler tube portion 106*b* is coupled to a second side, opening or inlet 118 of the inlet control valve 102 and a second end 120 is coupled to, for example, a deckfill 122. The deckfill 122 may be adapted for mounting to a deck of a marine vehicle such as, for example, a deck of a boat, and has an opening (not shown) for receiving a nozzle such as, for example, a nozzle of a fuel pump, etc. The deckfill 122 includes a fuel cap 124 that removably couples to the opening of the deckfill 122 and provides a relatively tight seal to prevent fuel vapors within the fuel tank 104 from escaping to the environment via the filler tube 106 when the fuel cap 124 is coupled to the deckfill 122. Thus, when the fuel cap 124 is coupled to the deckfill 122, fuel vapors are vented from the fuel tank 104 via the venting system 108 and not through the fuel cap 124.

In this example, the venting system 108 includes a vent valve 126 and a grade valve 128 that are coupled to the fuel tank 104. Tubing 130 fluidly couples the vent valve 126 and the grade valve 128. The vent valve 126 is fluidly coupled to a vent 132 that vents to, for example, the atmosphere. To help reduce venting emissions and/or pollutants to the environment, the venting system 108 may include a vapor collection apparatus 134, which is disposed between the vent 132 and the vent valve 126. An inlet 136 of the vapor collection apparatus 134 is fluidly coupled to the vent valve 126 via tubing 138 and an outlet 140 of the vapor collection apparatus 134 is fluidly coupled to the vent 132 via tubing 142. The vapor collection apparatus 134 comprises a canister 144 having an emission(s)-capturing or filter material (e.g., an adsorbent material) such as, for example, activated carbon, charcoal, etc., that collects and stores evaporative emissions such as, for example, hydrocarbons to reduce pollution to the environment. The emissions captured and stored by the canister 144 are returned or carried to the fuel tank 104 as air is drawn from the atmosphere and flows through the canister 144 between the outlet 140 and the inlet 136 and to the fuel tank 104 via the venting system 108.

The venting system 108 equalizes the pressure in the fuel tank 104 to accommodate volumetric changes (e.g., expansion) in the fuel tank 104. For example, when the pressure of fuel and/or vapors in the fuel tank 104 increases, fuel vapors are released from the fuel tank 104 through the venting system 108. In other words, an increase in pressure in the fuel tank 104 causes fuel vapors containing hydrocarbons in the fuel tank 104 to vent or release to the atmosphere via the vent 132. The vapor collection apparatus 134 then captures the hydrocarbons to prevent or significantly reduce such emissions to the atmosphere.

To fill the fuel tank 104, the fuel cap 124 is removed from the deckfill 122. During a filling operation, as the fuel tank 104 is being filled via the deckfill 122, the level of fuel 105 stored in the fuel tank 104 rises. The fuel vapors in the fuel tank 104 are displaced and vented from the fuel tank 104 via the venting system 108 and/or the filler tube 106 during a filling event. Additionally, such displacement of the fuel vapors from the fuel tank 104 may cause the fuel vapors to carry liquid fuel up through the filler tube 106.

Thus, fuel leakage or overflow may occur via the filler tube 106 during a filling operation. Such overflow can occur during a filling event when using a manually operated nozzle and/or an automatic nozzle when an automated shut-off is not activated. Such overflow typically occurs as the liquid level in the fuel tank 104 approaches an upper, interior surface 146 of the fuel tank 104 (e.g., when the fuel tank 104 is substantially full). As the liquid is filling in the fuel tank 104, the liquid fuel is displacing the air and/or fuel vapors in the fuel tank 104 to the atmosphere and/or environment via the filler tube 106. Further, as the liquid in the fuel tank 104 is filled beyond a recommended ullage, the liquid fuel restricts or prevents venting of the fuel vapors via the venting system 108 (e.g., via the grade valve 128 and/or the vent valve 126). As a result, the air and/or fuel vapors carry liquid fuel from the fuel tank 104 to, for example, the deck of a marine vehicle via the filler tube 106 and thereby causing liquid fuel spillage.

As described in greater detail below, the example inlet control valve 102 significantly reduces or prevents liquid fuel from flowing between the outlet 112 and the inlet 118 during an overflow event when liquid fuel is flowing within the filler tube 106 in a direction toward the opening of the deckfill 122 (e.g., a closed position of the inlet control valve 102). Thus, the inlet control valve 102 prevents liquid fuel from flowing from the fuel tank 104 and spilling onto a surface of a marine vehicle's deck via the deckfill 122. However, when the inlet control valve 102 is in the closed position, the inlet control valve 102 enables fuel vapors and/or air to flow between the outlet 112 and the inlet 118 of the inlet control valve 102 to equalize the pressure in the fuel tank 104 and/or the pressure within the filler tube 106 during an overfilling event if the liquid fuel inside the fuel tank 104 prevents venting via the venting system 108 as described above.

Figure 2:
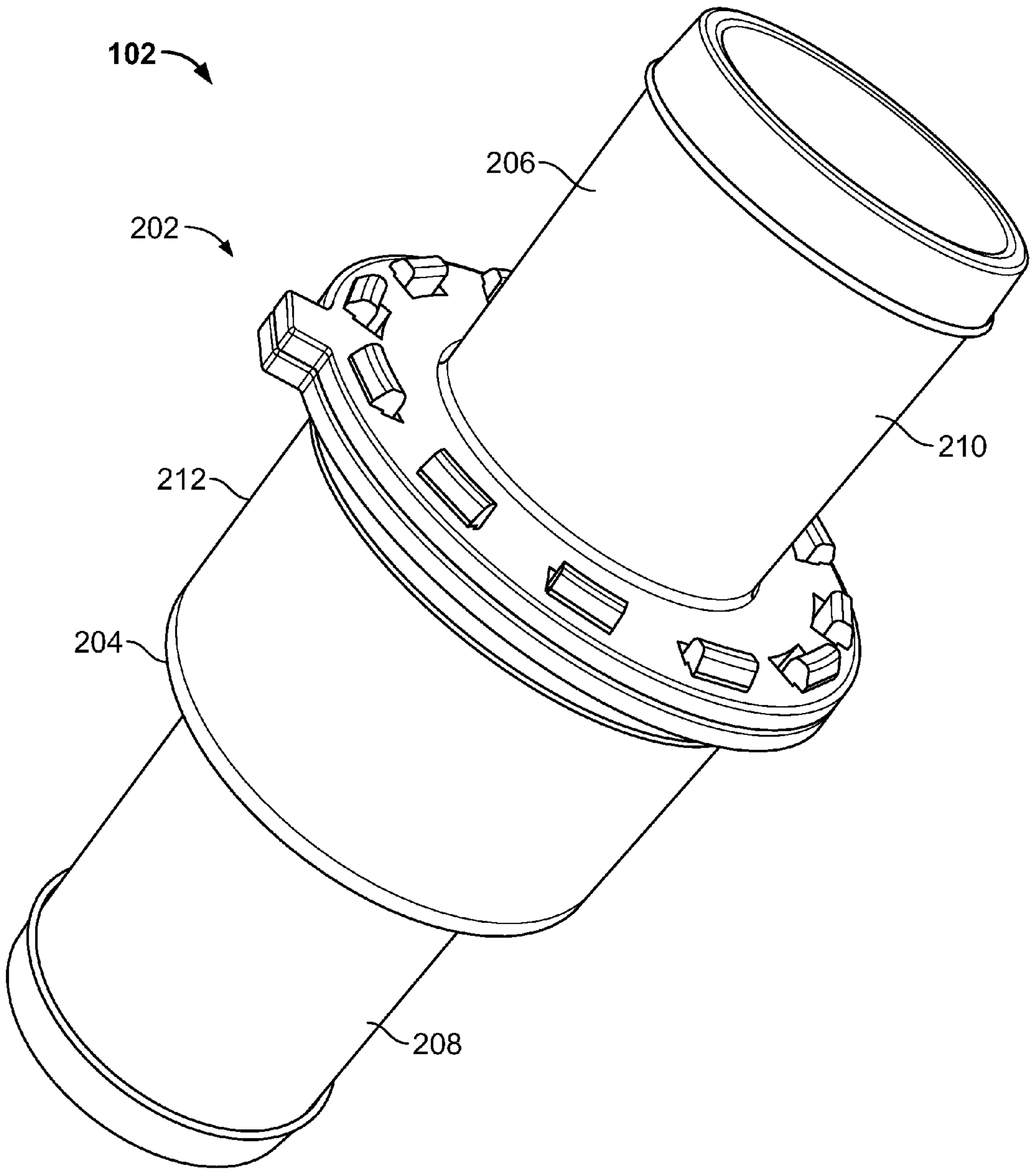
FIG. 2 is an enlarged view of the example inlet control valve of FIG. 1.

FIG. 2 in an enlarged view of the example inlet control valve 102 shown in FIG. 1. As shown in FIG. 2, the inlet control valve 102 includes a multi-piece valve body 202 having a first body portion 204 coupled to a second body portion 206. The first body portion 204 defines a first coupling member 208 (e.g., a barb fitting) to receive, for example, the filler tubing **106*a*, and the second body portion 206 defines a second coupling portion 210 (e.g., a barb fitting) to receive, for example, the filler tubing 106*b*. The first body portion 204 includes an enlarged body portion 212 adjacent the first coupling member 208. The first coupling member 208 and the enlarged body portion 212 are an integrally formed cylindrically-shaped member where the first coupling member 208 has a first diameter and the enlarged body portion 212 has a second diameter that is larger than the first diameter. The second body portion 206** also comprises a cylindrically-shaped body.

Figure 3:
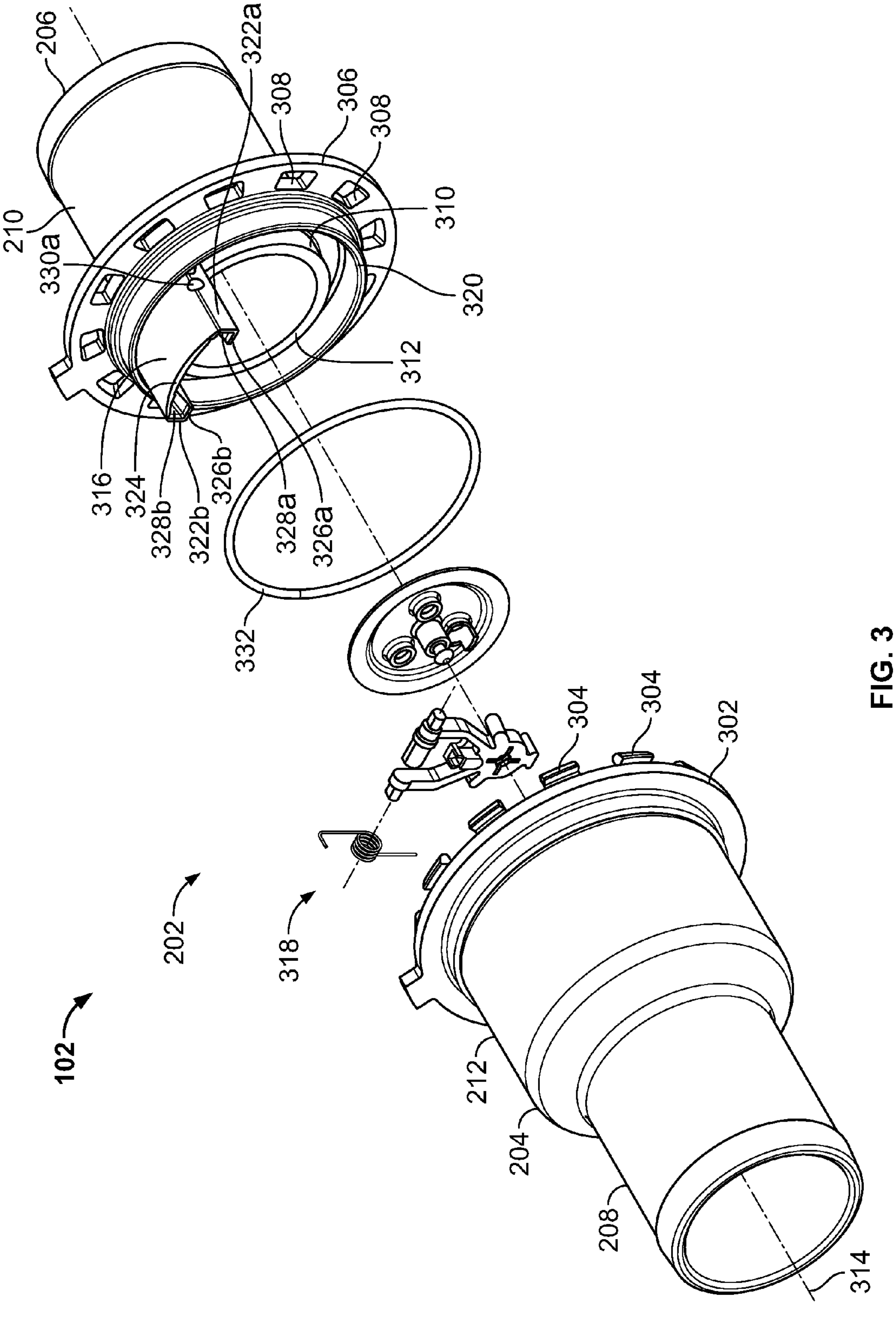
FIG. 3 illustrates an exploded view of the example inlet control valve of FIGS. 1 and 2.

FIG. 3 illustrates an exploded view of the example inlet control valve 102 of FIGS. 1 and 2. As shown in FIG. 3, the first body portion 204 includes a flange 302 disposed adjacent the enlarged body portion 212 and includes a plurality of fasteners 304. The first coupling member 208, the flange 302 and the fasteners 304 are integrally formed as unitary piece or structure and may be composed of, for example, a plastic material (e.g., a thermoplastic material such as High Density Polyethylene), a metallic material (e.g., stainless steel) or any other suitable material(s). The first body portion 204 may be manufactured via injection molding or any other suitable manufacturing process.

The second body portion 206 includes a flange 306 adjacent the second body portion 206. The flange 306 of the illustrated example includes a plurality of apertures or slots 308 corresponding to the plurality of fasteners 304 of the first body portion 204. In some examples, the flange 306 of the second body portion 206 includes the plurality of fasteners 304 and the flange 302 of the first body portion 204 includes the plurality of slots 308. In some examples, the flanges 302 and 306 include the fasteners 304 and the slots 308. In the illustrated example, the second body portion 206 also includes a valve seat 310 having a seating surface 312 adjacent the flange 306 of the second body portion 206. In this example, the valve seat 310 is coaxially aligned with a longitudinal axis 314 of the valve body 202. As illustrated in FIG. 3, the second body portion 206 also includes a mount or mounting member 316 to receive or mount a flow control member assembly 318 to the second body portion 206. In some examples, the first body portion 204 includes the mount or mounting member 316 and/or the valve seat 310. In the illustrated example, the flange 306, the valve seat 310 and the mounting member 316 are integrally formed with the second body member 206 as a unitary piece or structure and may be composed of, for example, a plastic material (e.g., a High Density Polyethylene), a metallic material (e.g., stainless steel) or any other suitable materials. The second body portion 206 may be manufactured via injection molding or any other suitable manufacturing process.

The mounting member 316 protrudes from an inner peripheral edge 320 of the second body portion 206 adjacent the valve seat 310. As shown, the mounting member 316 has an elongated C-shaped cross-sectional profile. The mounting member 316 includes legs 322*a* and 322*b* that extend or depend from an upper or outwardly facing curved surface 324. The leg 322*a* includes a foot or tab 326*a* that defines a first channel 328*a* and the leg 322*b* includes a foot or tab 326*b* that defines a second channel 328*b*. Each of the tabs 326*a* and 326*b* projects inwardly (e.g., substantially perpendicular) from a respective one of the legs 322*a* and 322*b* toward the longitudinal axis 314. An inner surface of each of the legs 322*a* and 322*b* includes a groove or slot 329 (FIG. 8A) to define the respective channels 328*a* and 328*b* that terminate at respective apertures 330*a* and 330*b* (FIG. 8A) formed in the mounting member 316. The aperture 330*a* is coaxially aligned with the aperture 330*b*. A seal 332 (e.g., an O-ring) is disposed between the first and second body portions 204 and 206.

Figure 4:
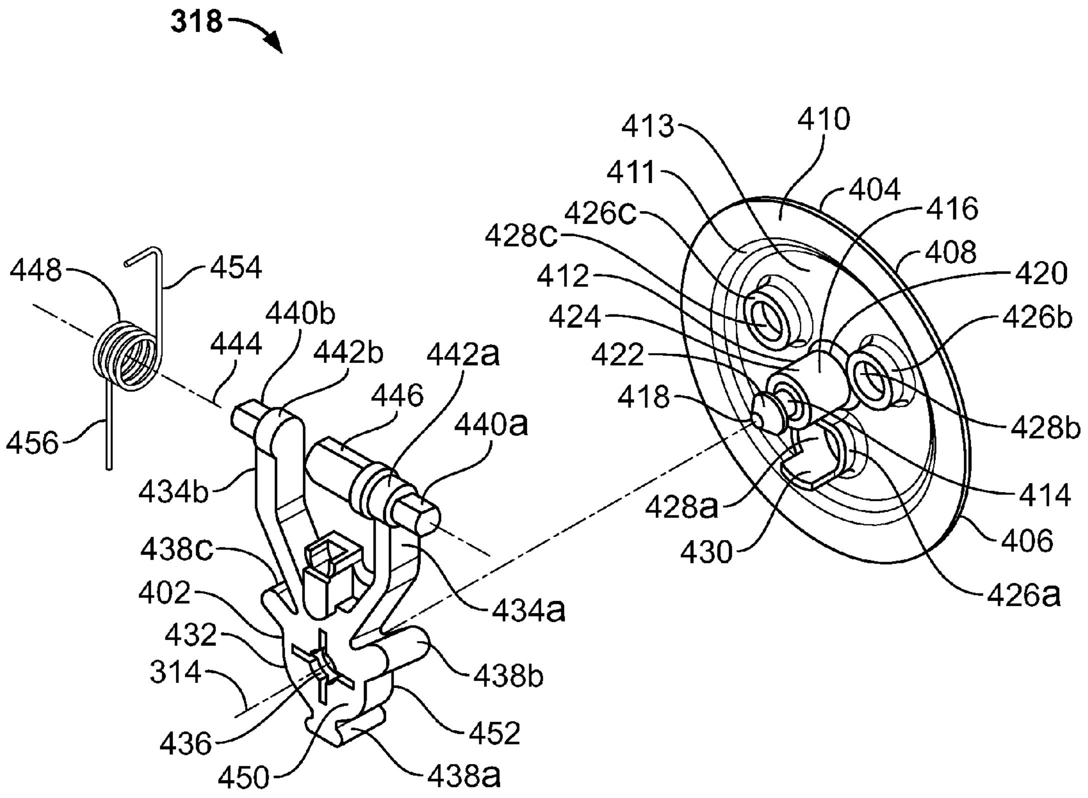
FIG. 4 illustrates an enlarged view of an example flow control assembly of the inlet control valve of FIGS. 1-3.

FIG. 4 illustrates an enlarged view of the example flow control member assembly 318 of FIG. 3. Referring to FIG. 3, the flow control member assembly 318 includes a support structure 402 that is coupled to a valve member 404. In this example, the valve member 404 is cylindrical disc 406 having a first side or surface 408 to engage the valve seat 310. The cylindrical disc 406 has a second side or surface 410, which includes a recessed or stepped wall 411 to define a recessed surface 413. A protruding member or coupling pin or clip 412 (e.g., a fastener) extends or protrudes from the recessed surface 413 and is to couple the disc 406 to the support structure 402. The coupling pin 412 includes a groove 414 along an outer surface 416 of the coupling pin 412 between a first end 418 and a second end 420 of the coupling pin 412. The groove 414 defines a first coupling portion 422 at the first end 418 of the coupling pin 412 and a second coupling portion 424. The second side 410 also includes a plurality of protruding bosses 426*a-c* having respective apertures 428*a-c*. The protruding boss 426*a* includes a semi-circular aperture 428*a* and support or bearing surface 430 extending from the boss 426*a*. In other examples, the coupling pin 412 may include a threaded end to receive a fastener (e.g., a nut) to couple the disc 406 to the support structure 402.

The support structure 402, which in this example is a control arm or pivot arm, includes a main body 432 having arms 434*a* and 434*b* extending from the main body 432 such that the support structure 402 has a Y-shaped cross-sectional profile. The main body 432 includes an opening 436 to receive the coupling pin 412 of the disc 406. The main body 432 also includes protruding members or alignment pins 438*a-c* to engage the respective bosses 426*a-c* protruding from the second side 410 of the disc 406. In particular, the alignment pins 438*a-c* are received by the respective apertures 428*a-c* of the bosses 426*a-c* to align the disc 406 and the support structure 402. Further, the alignment pin 438*a* engages the bearing surface 430 to provide structural support when the disc 406 is coupled to the support structure 402.

The arms 434*a* and 434*b* include respective tabs 440*a* and 440*b* that project outwardly from respective ends 442*a* and 442*b* of the arms 434*a* and 434*b* such that an axis 444 of the tabs 440*a* and 440*b* is substantially perpendicular to the longitudinal axis 314 of the valve body 202 of the inlet control valve 102. Further, the arm 434*a* includes a biasing element support member 446 (e.g., a cylindrical member) that extends at least partially between the arms 434*a* and 434*b* of the support structure 402. The biasing element support member 446 is to receive a biasing element 448. In this example, the biasing element 448 is a torsion spring.

Referring also to FIG. 3, to assemble the flow control member assembly 318, the disc 406 is coupled to the support structure 402. In particular, the coupling pin 412 of the disc 406 is disposed within the opening 436 of the support structure 402 such that the groove 414 of the coupling pin 412 is disposed within the opening 436 of the main body 432, the first coupling portion 422 at the first end 418 of the coupling pin 412 engages or is adjacent to a first surface or side 450 of the main body 432, and the second coupling portion 424 of the coupling pin 412 engages or is adjacent a second side or surface 452 of the main body 432 opposite the first surface 450. This engagement between the coupling pin 412 and the support structure 402 is described in greater detail below in connection with FIG. 8A. When the disc 406 is coupled to the support structure 402, the alignment pins 438*a-c* engage the apertures 428*a-c* of the respective bosses 426*a-c* to align the disc 406 and the support structure 402.

The tabs 440*a* and 440*b* of the arms 434*a* and 434*b* of the support structure 402 are then disposed within the respective channels 328*a* and 328*b* of the legs 322*a* and 322*b* of the mounting member 316 and are slidably engaged with the slots or grooves 329 (FIG. 8A) of the channels 328*a* and 328*b* until each of the tabs 440*a* and 440*b* is disposed within a respective one of the apertures 330*a* and 330*b* (FIG. 8A) of the mounting member 316. When the tabs 440*a* and 440*b* engage the respective apertures 330*a* and 330*b* (FIG. 8A) of the mounting member 316, the support structure 402 and the disc 406 are pivotally coupled to the mounting member 316. More specifically, the support structure 402 and the disc 406 pivot about the axis 444 of the tabs 440*a* and 440*b* relative to the mounting member 316 and the valve seat 310 (i.e., the second body portion 206). A first portion 454 (e.g., a first prong) of the biasing element 448 engages an inner surface of the upper surface 324 of the mounting member 316 and a second portion 456 (e.g., a second prong) engages a surface of the support structure 402 to bias the disc 406 toward the valve seat 310. In other examples, the mounting member 316 may be integrally formed with the first body portion 204. For example, the mounting member 316 may protrude toward the second body portion 206 from a surface of the flange 302 or the first body portion 204.

During assembly, the flow control member assembly 318 is coupled to the second body portion 206 and then the first body portion 204 is coupled to the second body portion 206 via a snap-fit connection as described below in connection with FIGS. 5 and 6.

Figure 5:
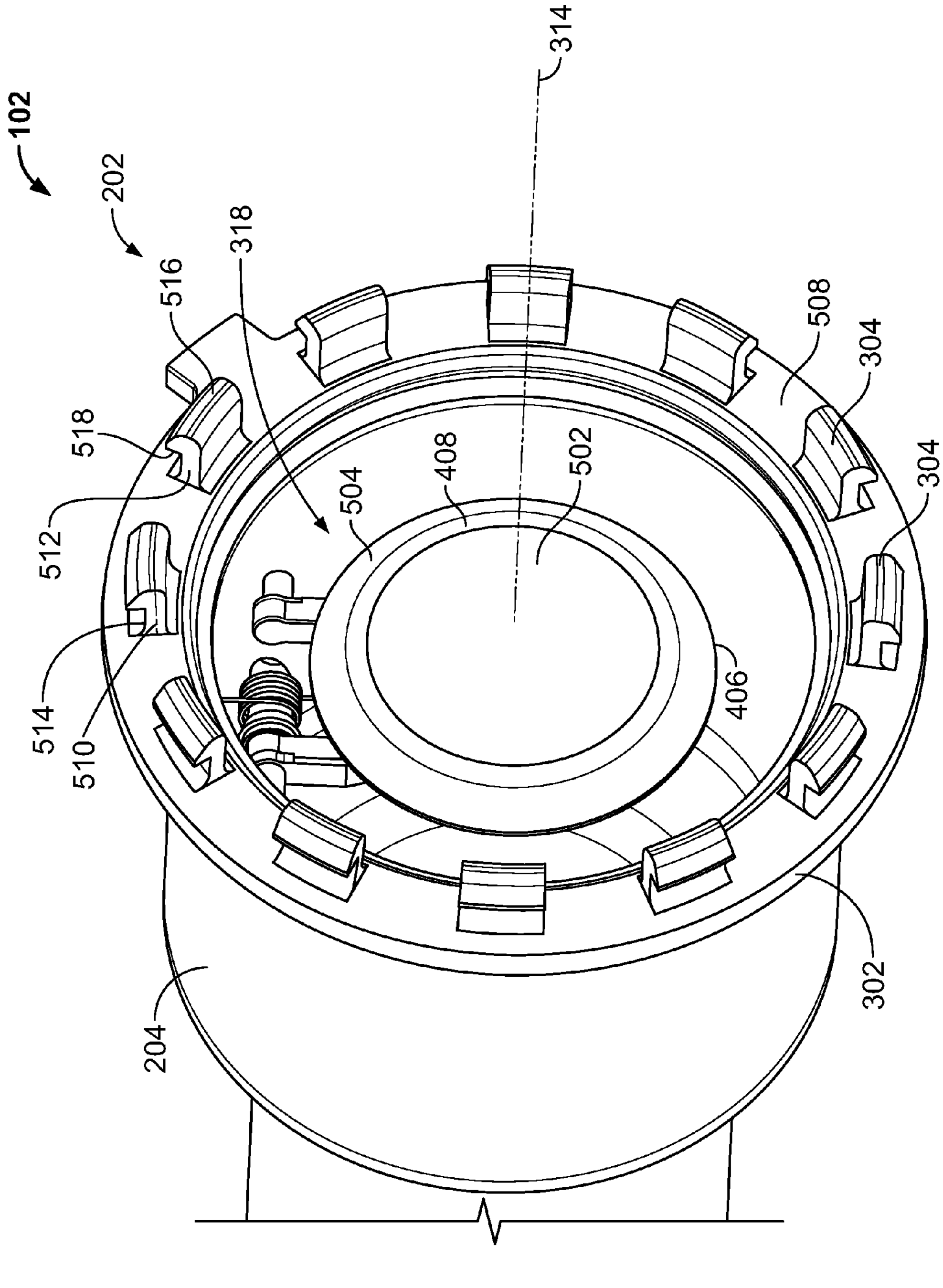
FIG. 5 illustrates the example inlet control valve of FIGS. 1-3 having a portion removed to show the flow control member of the inlet control valve.

FIG. 5 illustrates the example inlet control valve 102 having the second body portion 206 removed to show the flow control assembly 318 within the valve body 202. As shown, the first side 408 of the disc 406 includes a central portion 502 and a valve seat engaging portion 504. The valve seat engaging portion 504 has a profile that tapers or angles from the central portion 504 toward the second side 410 (FIGS. 3 and 4) of the disc 406. As most clearly shown in FIGS. 5, 8A and 8B, the plurality of fasteners 304 comprise a plurality of clips that protrude from a surface 508 of the flange 302. As shown, the fasteners or clips 306 protrude from the flange 302 such that an axis 510 of the clips 306 is at an angle (i.e., nonparallel) relative to the longitudinal axis 314 of the valve body 202. In other words, the clips 306 protrude from the surface 508 of the flange 302 at an angle (i.e., are splayed) relative to the longitudinal axis 314 so that they are biased radially outwardly relative to the longitudinal axis 314 (e.g., springably biased). Each of the clips 306 includes a body portion 512 having a slot engaging surface 514 and a curved portion 516 having a flange engaging surface 518. The body portion 512 and the curved portion 516 define an L-shaped cross-sectional profile. In this example, the clips 306 are integrally formed with the flange 302 (e.g., via injection molding) as a unitary piece or structure.

Figure 6:
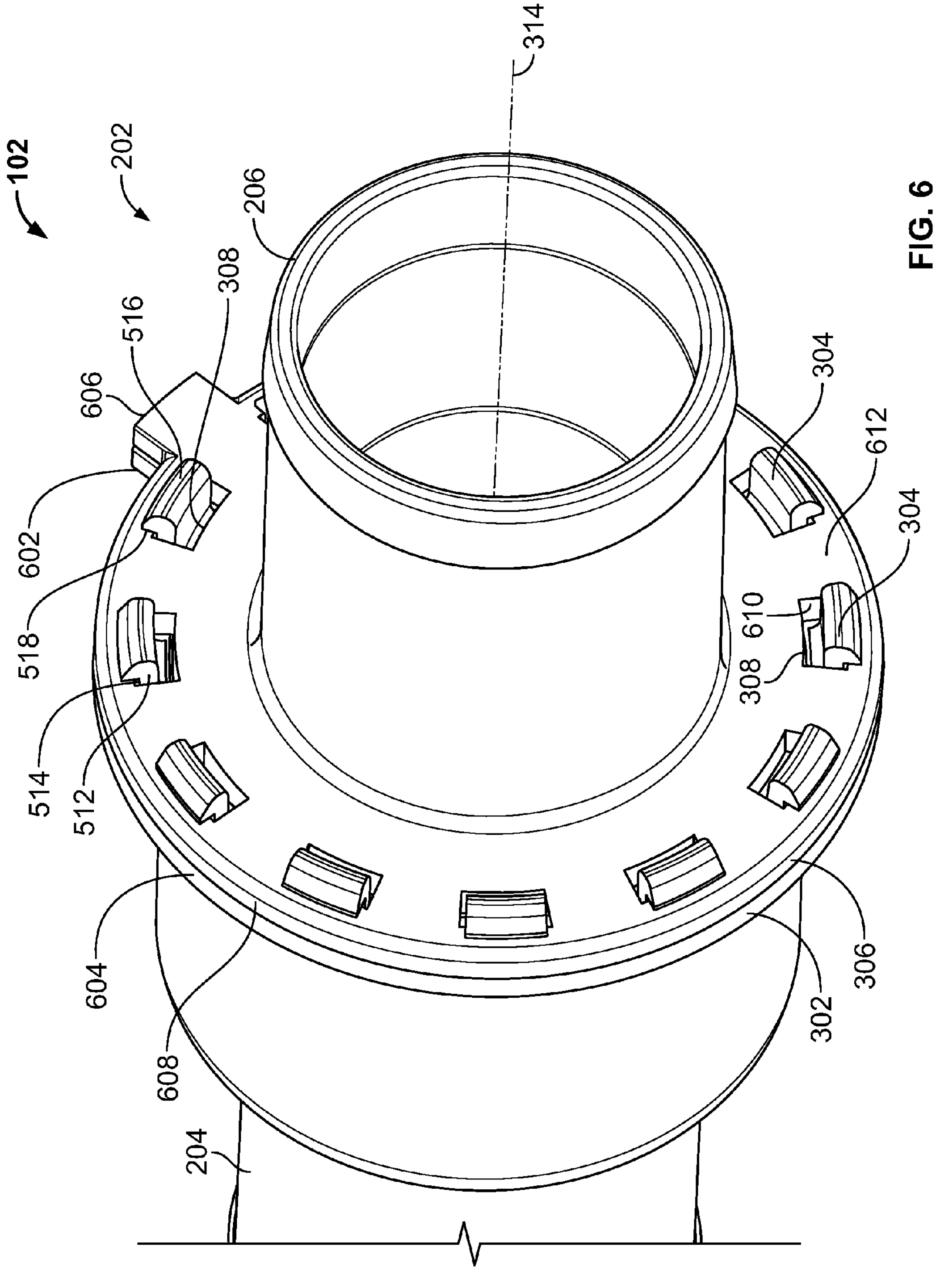
FIG. 6 illustrates the inlet control valve of FIGS. 1-5 in an assembled state or condition.

FIG. 6 illustrates the inlet control valve 102 in an assembled state or condition. To assemble the first and second body portions 204 and 206, an alignment tab 602 protruding from a peripheral edge 604 of the flange 302 is aligned with an alignment tab 606 protruding from a peripheral edge 608 of the flange 306. The alignment tabs 602 and 606 provide a visual indication that the first and second body portions 204 and 206 are properly aligned during assembly of the valve body 202. The plurality of slots 308 receives the plurality of fasteners 304 via a snap-fit connection. When coupling the first and second body portions 204 and 206 together, each curved portion 516 of the fasteners 304 engages an inner surface 610 of the slots 308, causing the fasteners 304 to deflect inwardly toward the longitudinal axis 314 of the valve body 202. When each curved portion 516 clears or moves past the inner surface 610 of the slots 308, the fasteners 304 springably move radially outwardly relative to the longitudinal axis 314 because the body portion 512 of the fasteners 304 are angled relative to the longitudinal axis 314. When coupled together, the slot engaging surface 514 of the fasteners 304 engages the respective inner surface 610 of the slots 308 and the flange engaging portion 518 of the fasteners 304 engages a surface 612 of the flange 306. Also, because the fasteners 304 are angled relative to the longitudinal axis 314, the first body portion 204 remains coupled to the second body portion 206. Thus, the fasteners 304 provide a snap-fit connection to prevent the first and second body portions 204 and 206 from being decoupled after the valve body 202 is assembled.

Although not shown, in other examples, a portion (e.g., a portion of the flange 302) of the first body portion 204 is integrally coupled to a portion (e.g., a portion of the flange 306) of the second body portion 206 via, for example, a thin, flexible hinge member (e.g., a thin member composed of plastic) so that the first body portion 204 pivots relative to the second body portion 206 prior to being assembled (i.e., the first and second body portions 204 and 206 are in a decoupled state or condition). A second side (e.g., opposite the flexible hinge) includes a fastener (e.g., the slots 308 and the clips 306) to couple the first and second body portions 204 and 206 together (e.g., via a clip and slot configuration) after the flow control assembly 318 is assembled with the second body portion 206.

Figure 7:
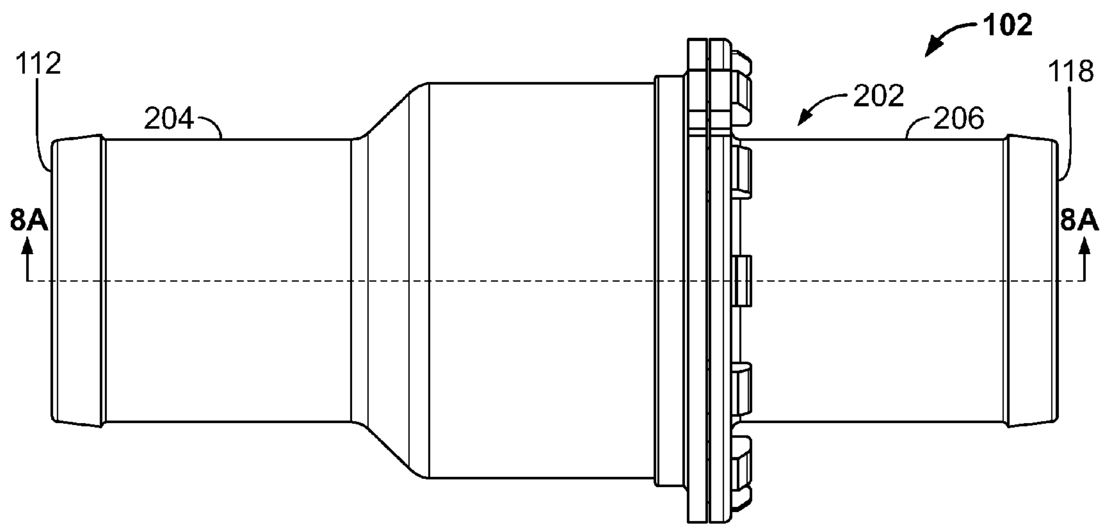
FIG. 7 illustrates a side view of the example inlet control valve of FIGS. 1-6.

FIG. 7 illustrates a side view of the example inlet control valve 102 shown in the assembled state.

Figure 8A:
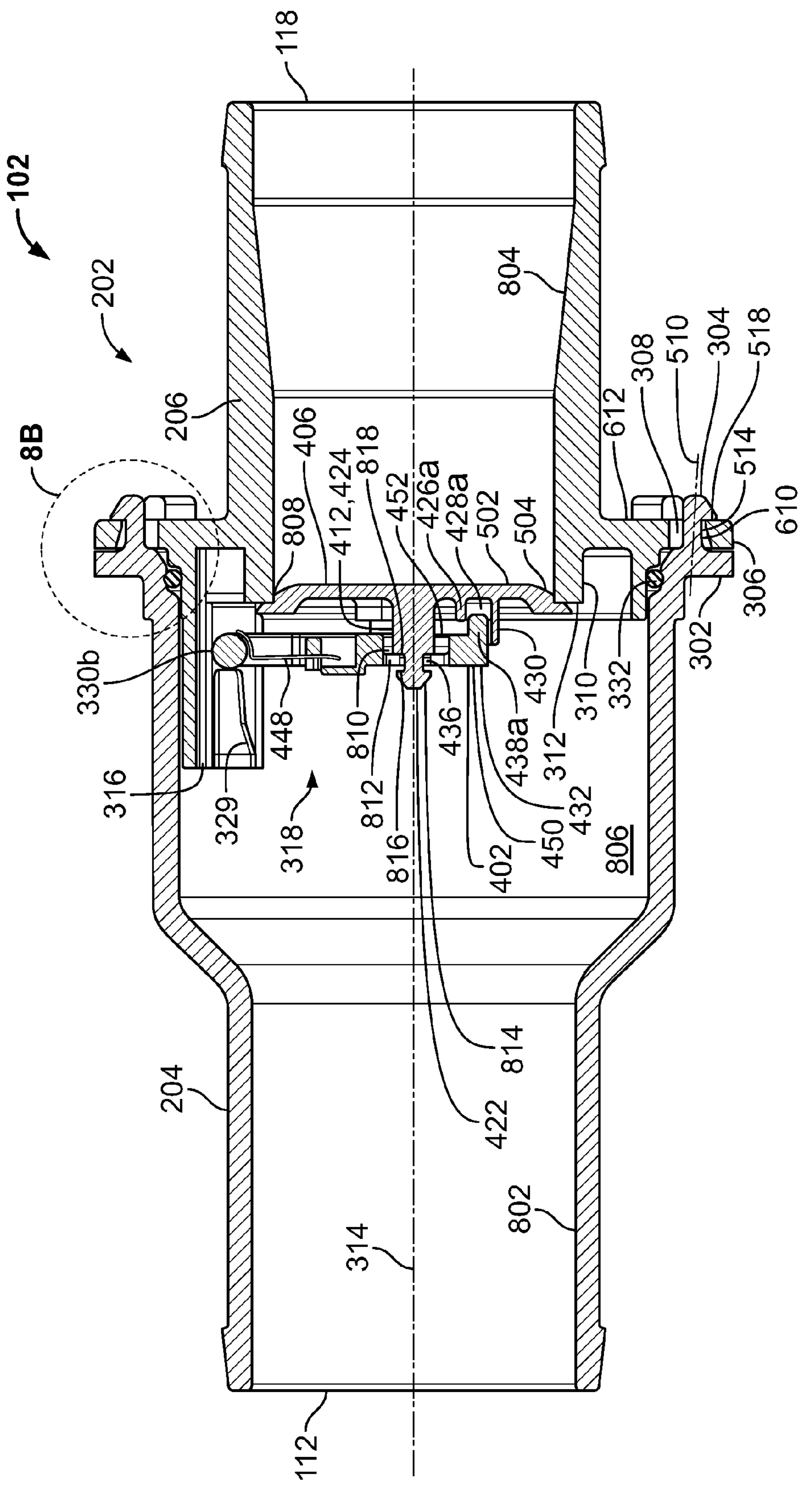
FIG. 8A illustrates a cross sectional view of the example inlet control valve taken along line A-A of FIG. 7.
Figure 8B:
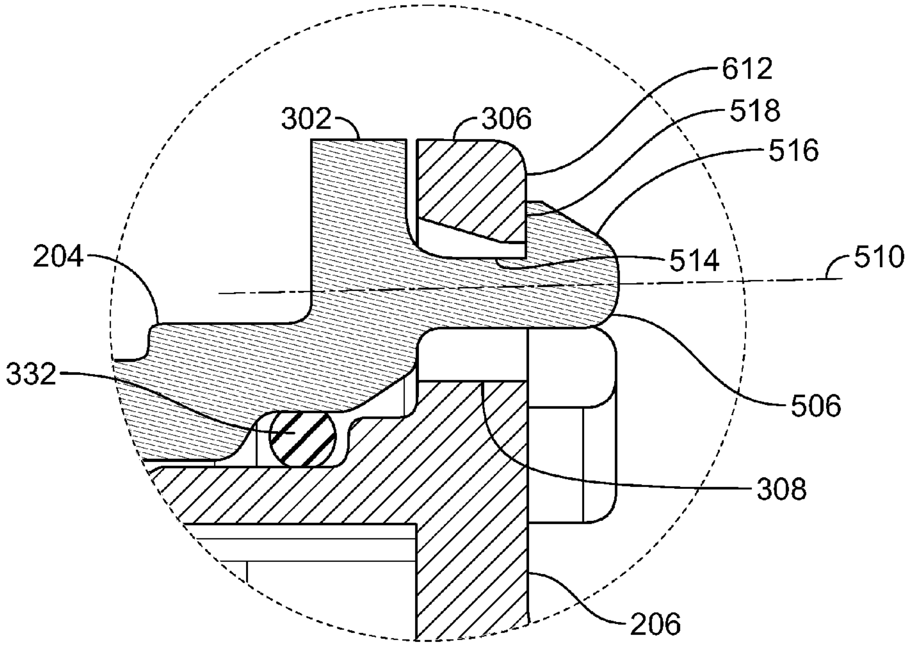
FIG. 8B illustrates an enlarged view of a portion of the example inlet control valve of FIG. 8A.

FIG. 8A illustrates a cross-sectional view of the inlet control valve 102 taken along line A-A of FIG. 7. FIG. 8B illustrates an enlarged portion of the example inlet control valve 102 of FIG. 8A.

Referring to FIGS. 8A and 8B, when coupled together, an opening 802 of the first body portion 204 and an opening 804 of the second body portion 206 define a fluid flow passageway 806 between the inlet 118 of the inlet control valve 102 and the outlet 112 of the inlet control valve 102. The valve seat 310 is disposed within the passageway 806 to define an orifice 808 of the passageway 806. The flow control assembly 318 is also disposed within the passageway 806 to control the flow of fluid between the inlet 118 and the outlet 112 of the inlet control valve 102.

As more clearly shown in FIG. 8A and also referring to FIG. 4, the second side 452 of the support structure 402 includes a recessed opening 810 to define a shoulder 812 adjacent the opening 436 of the main body 432. As shown, a diameter of the recessed opening 810 is larger than the diameter of the opening 436 to form or define the shoulder 812. The first coupling portion 422 of the coupling pin 412 includes a curved or angled portion 814 and an annular shoulder 816. When the coupling pin 412 is inserted within the recessed opening 810 and the opening 436 of the main body 432, the curved or angled portion 814 of the first coupling portion 422 enables the first coupling portion 422 to move through the opening 436 in a direction toward the first body portion 204. The shoulder 816 engages the first side or surface 450 of the main body 432 to prevent the disc 406 from moving in a direction (e.g., a longitudinal direction along axis 316) toward the second body portion 206. Additionally, an end 818 of the second coupling portion 424 engages the shoulder 812 formed within the recessed opening 810 of the second side 452 to limit or restrict movement of the disc 406 in a direction (e.g., a longitudinal direction along axis 316) toward the second body portion 204 after the first coupling portion 422 moves through the opening 436 and past the shoulder 812 adjacent the first side 450 of the support structure 402. Thus, the coupling pin 412 couples to the support structure 402 via a snap-fit connection and prevents the disc 406 from being removably decoupled from the support structure 402.

During normal operation (i.e., a non-filling event), the biasing element 448 biases the disc 406 toward the valve seat 310 so that the inlet control valve 102 is in a closed position. As shown, the biasing element 448 biases the disc 406 toward the valve seat 310 so that the valve seat engaging portion 504 of the disc 406 engages the seating surface 312 of the valve seat 310. In other words, the second side 410 of the disc 406 is substantially perpendicular to the longitudinal axis 314 of the valve body 202 when the inlet control valve is in the closed position. As most clearly shown in FIG. 8B, the seal 332 is disposed between the first and second body portions 204 and 206 to prevent fluid from escaping or entering between the first and second body portions 204 and 206 and to the environment.

During a filling event, when the fuel tank 104 is being filled with liquid fuel 105, the liquid fuel traveling through the passageway 806 moves or pivots the disc 406 to an open position so that the valve seat engaging surface 504 of the disc 406 is away from the valve seating surface 312 of the valve seat 310 to allow the liquid fuel to flow through passageway 806 between the inlet 118 and the outlet 112 and to the fuel tank 104. In other words, the liquid fuel moves or pivots the disc 406 against the force of the biasing element 448 to move the disc 406 away from the valve seat 310 such that the second side 410 of the disc 406 is adjacent (i.e., substantially parallel with) the mounting member 316 or the longitudinal axis 314 when in the open position.

As the volume or the level of liquid fuel 105 within the fuel tank 104 rises or increases, the vapors and/or air within the fuel tank 104 are vented or displaced via the venting system 108 and/or via the filler tube 106 through the passageway 806 of the inlet control valve 102. Thus, the fuel vapors may vent to the atmosphere via the filler tube 106 and through the inlet control valve 102 to enable the pressure within the fuel tank 104 to equalize.

However, in some cases, such displacement of the fuel vapors from the fuel tank 104 may cause the fuel vapors to carry liquid fuel through the filler tube 106 and out to the environment through the filler tube 106. Such overflow typically occurs as the liquid level in the fuel tank 104 approaches the upper, interior surface 146 of the fuel tank 104 (e.g., when the fuel tank 104 is substantially full). Thus, the increasing pressure may cause the liquid fuel to travel toward the deckfill 122 via the filler tube 106. As the liquid fuel from the fuel tank 104 enters the outlet 112 of the inlet control valve 102, the liquid fuel fills the enlarged body portion 212 and engages the second side 410 of the disc 406. This liquid fuel from the outlet 112 causes the disc 406 to move toward the valve seat 310 such that the valve seat engaging portion 504 of the disc 406 engages the seating surface 312 of the valve seat 310. Because the pressure of the liquid fuel within the fuel tank 104 (i.e., the outlet 112 side of the inlet control valve 102) is greater than the pressure of the liquid fuel of the inlet 118 side of the inlet control valve 102 (e.g., atmospheric pressure), the pressure differential across the disc 406 along with the biasing element 484 cause the disc 406 to pivot and engage the valve seat 310.

Although the disc 406 engages the valve seat 310 to prevent liquid fuel from flowing through the passageway 806 from the outlet 112 to the inlet 118, the disc 406 does not provide a tight seal and allows fuel vapors and/or air to flow through the passageway 806 between the inlet 118 and the outlet 112 to vent the fuel tank 104 during an overfill condition. For example, the seating surface 312 of the valve seat 310 and the sealing surface 504 of the disc 406 may include a relatively smooth non-textured surface. However, even with the use of a relatively smooth non-textured surface, the surface finish or roughness of the disc 406 and/or the valve seat 310 enables fuel vapors and air to flow past the sealing surface 504 and the seating surface 312 when the disc 406 engages the valve seat 310 due to surface finish imperfections or variations. In other examples, the surface finish of the sealing surface 504 and/or the seating surface 312 may include a relatively rough surface finish to allow greater fuel vapor and/or air flow through the inlet control valve 102. In yet another example, a groove or notch (e.g., an annular groove) may be formed within the sealing surface 504 of the disc 406 and/or the seating surface 312 of the valve seat 310 to provide a gap between the disc 406 and the valve seat 310 and provide a relatively greater flow of fuel vapors and/or air through the inlet control valve 102 when the disc 406 is in engagement the valve seat 310. Thus, the example inlet control valve 102 substantially restricts or prevents liquid fuel from flowing between the fuel tank 104 and the atmosphere during an overflow filling event, while allowing fuel vapors and/or air to flow between the atmosphere and the fuel tank 104 to equalize the pressure within the fuel tank 104 and/or the filler tube 106.

Figure 9:
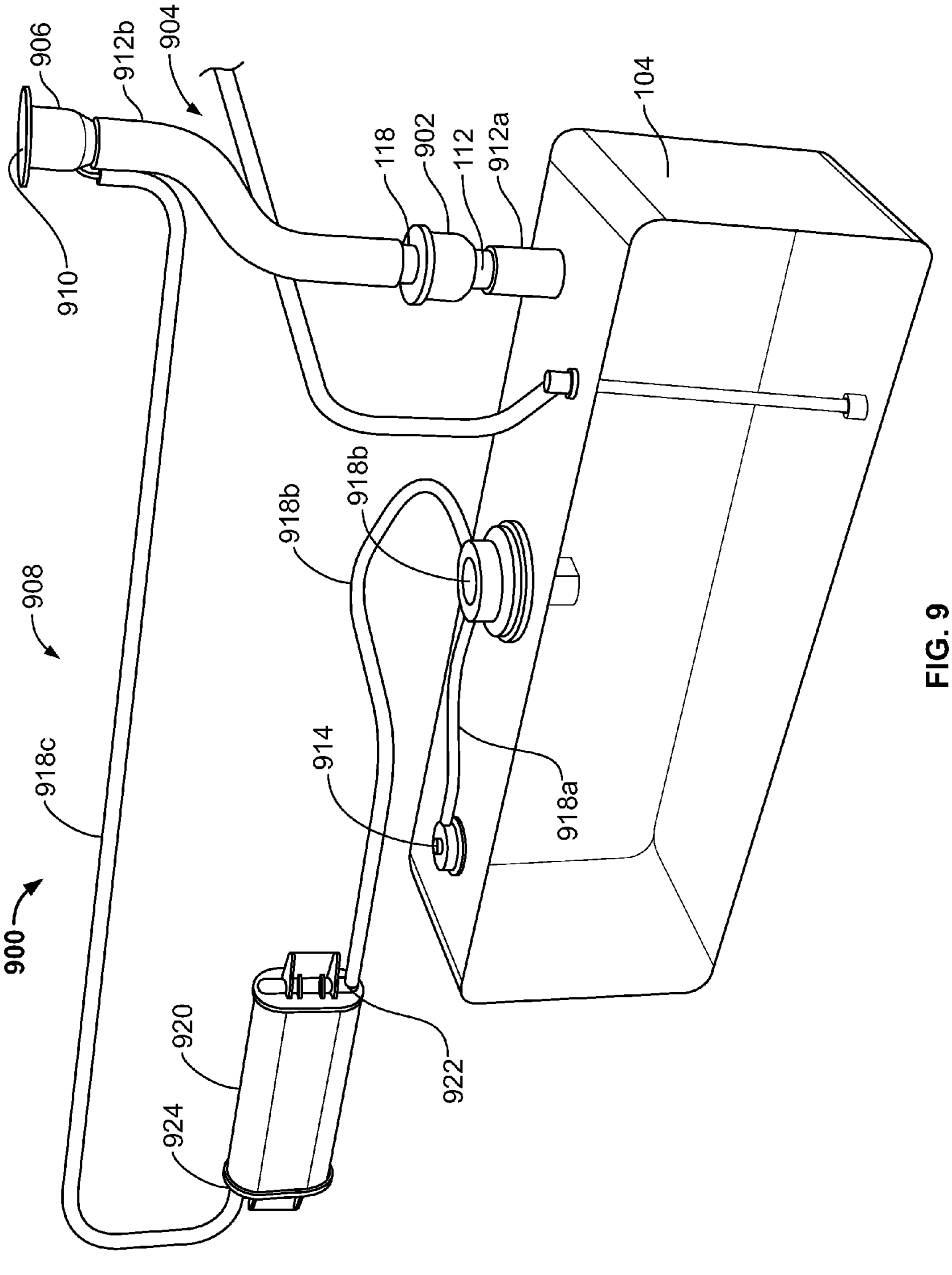
FIG. 9 illustrates yet another example fuel delivery system implemented with another example inlet control valve described herein.

FIG. 9 illustrates another example fuel delivery system 900 that is implemented with another example inlet control valve 902 described herein. Those components of the example inlet control valve 902 of FIG. 9 that are substantially similar or identical to those components of the example inlet control valve 102 described above in FIGS. 1-7, 8A, and 8B, and that have functions substantially similar or identical to the functions of those components will be referenced with the same reference numbers as those components described in connection with FIGS. 1-7, 8A, and 8B and will not be described in detail again below. Instead, the interested reader is referred to the above corresponding descriptions in connection with FIGS. 1-7, 8A, and 8B.

In this example, the fuel delivery system 900 includes a filler tube 904 having a deckfill 906 and a venting system 908 that vents to the atmosphere via a fuel cap 910 of the deckfill 906. The inlet control valve 902 is in fluid communication with the fuel tank 104 and the fuel cap 910. In particular, tubing 912*a* fluidly couples the fuel tank 104 to the outlet 112 of the inlet control valve 902 and tubing 912*b* fluidly couples the inlet 118 of the inlet control valve 902 to the fuel cap 910. The venting system 908 includes a grade valve 914 and a vent valve 916 coupled to the fuel tank 104. The grade valve 914 is fluidly coupled to the vent valve 916 via tubing 918*a* and the vent valve 916 is in fluid communication with the fuel cap 910 of the deckfill 906. In this example, the venting system 908 includes a vapor collection apparatus 920 disposed between the vent valve 916 and the fuel cap 910 of the deckfill 906. Tubing 918*b* fluidly couples the vent valve 916 to an inlet 922 of the vapor collection apparatus 920 and tubing 918*c* fluidly couples an outlet 924 of the vapor collection apparatus 920 to the fuel cap 910. In this example, the fuel cap 910 enables venting to the atmosphere. Therefore, fuel vapors and/or air can vent to the atmosphere via the fuel cap 910. Such an example fuel cap 910 is described in U.S. patent application Ser. No. 12/061,183, which is incorporated herein by reference in its entirety.

During a filling event, and similar to the inlet control valve 102 of FIGS. 1-7, 8A, and 8B, the inlet control valve 902 prevents liquid fuel from flowing between the fuel tank 104 and the filler tube 904 as the liquid fuel level 105 in the fuel tank 104 rises and the fuel vapors displace liquid fuel up within the filler tube 904. In contrast to the inlet control valve 902 and as described in greater detail below, the example inlet control valve 902 prevents fuel vapors and/or air from flowing through the inlet control valve 902 when the inlet control valve 102 is in a closed position.

Additionally, during non-operation of the marine vehicle, the fuel delivery system 900 may be subjected to daily ambient temperature changes that may cause or affect the pressure of the fuel and/or fuel vapors within the fuel delivery system 900 (e.g., during diurnal temperature cycles). For example, an increase in fuel tank pressure may cause the release of hydrocarbons or gasoline to the environment. Diurnal emissions are evaporative emissions that are released due to daily temperature changes or cycles that may cause liquid fuel to become fuel vapor during the daylight hours and condensing fuel vapors to liquid during the night hours. As a result, the pressure cycling that occurs in response to these temperature changes causes the release of hydrocarbons from the fuel tank 104 to the environment via the venting system 908 and the fuel cap 910. The vapor collection apparatus 920 captures the hydrocarbons to prevent emissions to the atmosphere.

As described in greater detail below, the inlet control valve 902 prevents fuel vapors, air and/or diurnal emissions from flowing between the fuel tank 104 and the fuel cap 910. In other words, the inlet control valve 902 provides a seal so that the fuel vapors, air and/or diurnal emissions travel through the vapor collection apparatus 920 of the venting system 908. As noted above, the vapor collection apparatus 920 includes an emission(s)-capturing or filter material (e.g., an adsorbent material) such as, for example, activated carbon, charcoal, etc., that collects and stores evaporative emissions such as, for example, hydrocarbons to reduce pollution to the environment. In other examples, the fuel delivery system 900 may be implemented with the pressure relief system, a pressure relief valve, and/or any other pressure relief apparatus instead of the vapor collection apparatus 920. The pressure relief system allows diurnal emissions to vent to the environment via the fuel cap 910 when the pressure inside the fuel tank 104 is greater than a predetermined or preset pressure value (e.g., 5 psi) and prevent diurnal emissions from venting to the atmosphere when the pressure inside the fuel tank 104 is below the predetermined pressure. Such an example fuel cap and pressure relief system is described in U.S. patent application Ser. No. 12/793,003, which is incorporated herein by reference in its entirety.

Figure 10:
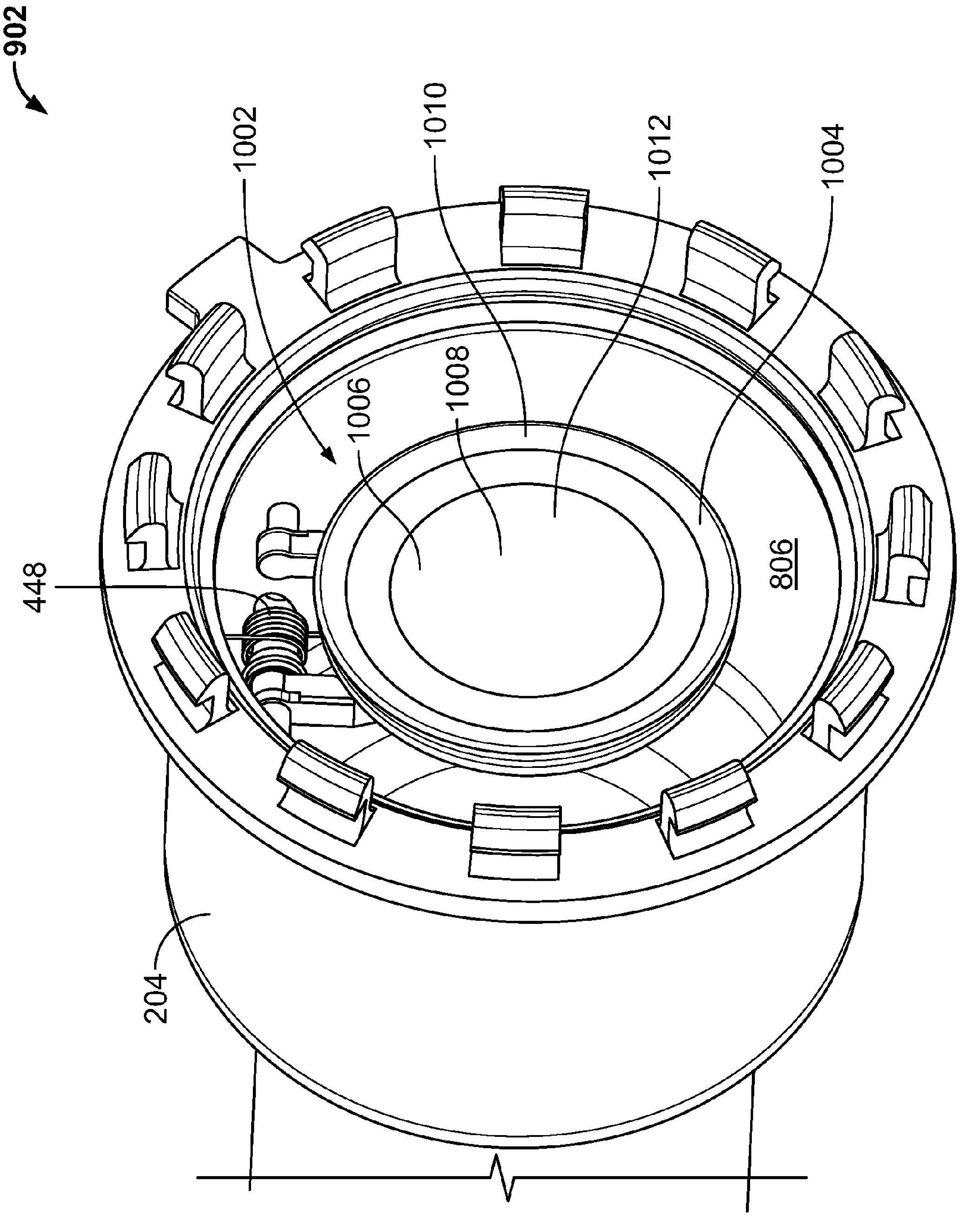
FIG. 10 illustrates the example inlet control valve of FIG. 9 having a portion removed to show a flow control member of the inlet control valve.

FIG. 10 illustrates the example inlet control valve 902 of FIG. 9 shown without the second body portion 206 to illustrate a flow control assembly 1002 of the inlet control valve 902. In this example, the flow control assembly 1002 includes a sealing material or sealing surface 1004 that provides a relatively tight seal to prevent fluid flow through the passageway 806 when the sealing surface 1004 sealingly engages the seating surface 312 the valve seat 310. As shown in this example, the flow control member is a disc 1006. The disc 1006 includes a central portion 1008 and the sealing surface 1004, which includes a peripheral edge 1010 that tapers away from the central portion 1008. In this example, the disc 1006 is composed of a plastic material (e.g., HDPE) having a first side or surface 1012 overmolded with a rubber material such as, for example, a fluoroelastomer material (e.g., FKM or other synthetic rubber materials) to provide the sealing surface 1004. In other examples, the disc 1006 is completely overmolded with a rubber material. The disc 1006 couples to the support structure 402 in a manner substantially similar to the disc 406 described in FIGS. 4 and 8A.

In other examples, the disc 1006 may be composed of a plastic material having an annular groove or channel adjacent the peripheral edge that is to receive a seal such as, for example, an O-ring. In yet other examples, the disc 1006 may be composed of a rubber material, a composite material, or any other material that provides a relatively tight seal to prevent liquid fuel, fuel vapors, air and/or diurnal emissions from flowing past the orifice 808 of the valve seat 310 when the disc 1006 sealingly engages the valve seat 310.

Figure 11:
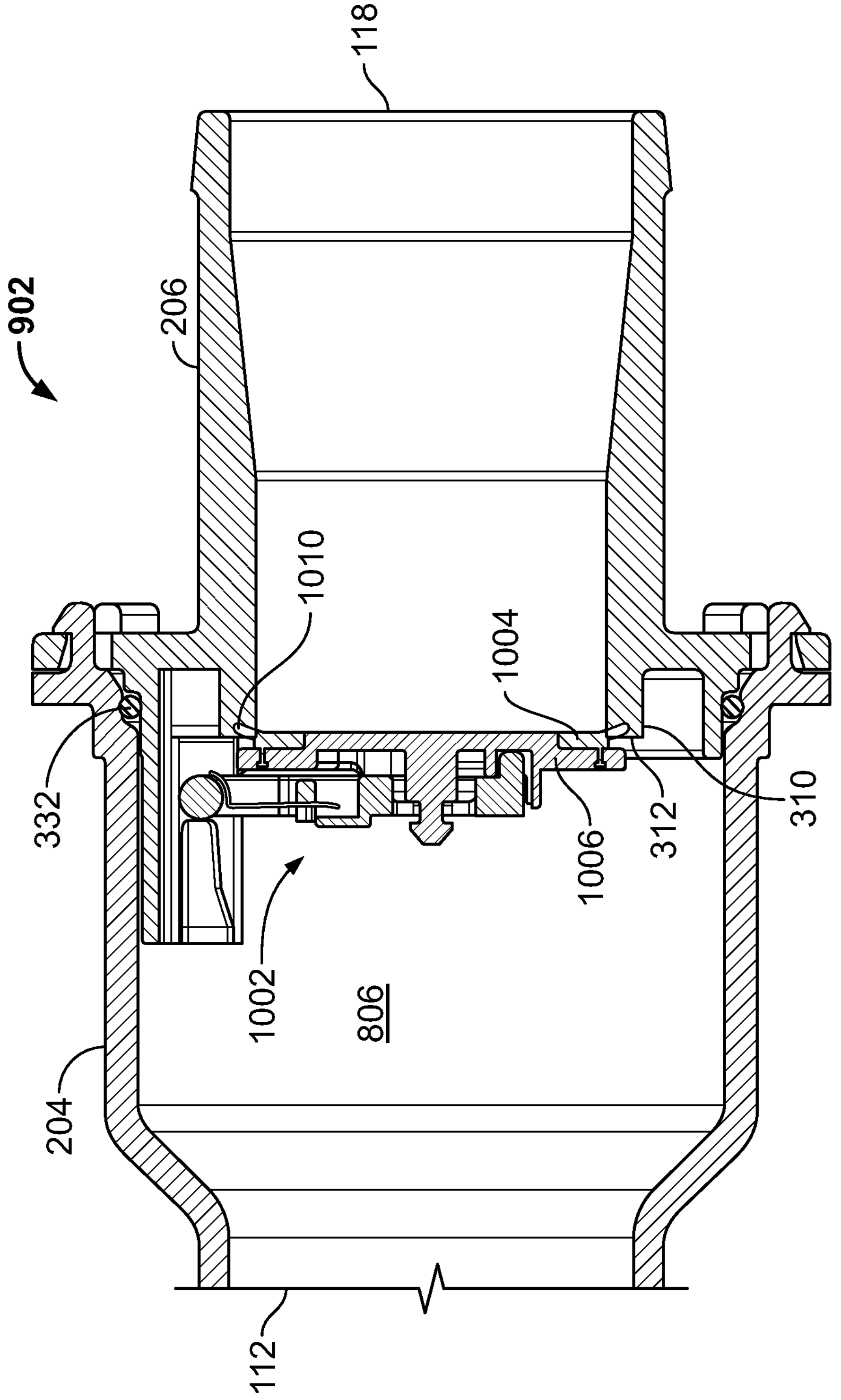
FIG. 11 illustrates a cross sectional view of the example inlet control valve of FIGS. 9 and 10.

FIG. 11 illustrates a partial cross-sectional view of the example inlet control valve 902. In operation, the torsion spring 448 biases the disc 1006 toward the valve seat 310 so that the sealing surface 1004 sealingly engages the seating surface 312 the valve seat 310. The sealing surface 1004 provides a relatively tight seal when engaged with the valve seat 310 to prevent the flow of fuel vapors, air and/or diurnal emissions from escaping between the fuel tank 104 and the fuel cap 910 via the filler tube 904. In this manner, the fuel vapors, air and/or the diurnal emissions are forced to flow between the fuel tank 104 and the fuel cap 910 via the venting system 908. As the fuel vapors and/or the diurnal emissions emit or vent to the atmosphere via the venting system 908 and the fuel cap 910, the vapor collection apparatus 920 collects and stores evaporative emissions such as, for example, hydrocarbons to reduce pollution to the environment. The stored emissions captured and stored by the vapor collection apparatus 920 are returned or carried to the fuel tank 104 as air flows through the vapor collection apparatus 920 when the air is drawn from the atmosphere to the fuel tank 104 via the fuel cap 910 and the venting system 908.

During normal operation (i.e., a non-filling event), the biasing element 448 biases the disc 1006 toward the valve seat 310 so that the valve 902 is in a closed position to prevent fluid flow through the passageway 806. During a filling event, liquid fuel flowing from the inlet 118 to the outlet 112 (and to the fuel tank 104) causes the disc 1006 to move away from the valve seat 310 to an open position to allow liquid fuel flow through the passageway 806 and to the fuel tank 104. However, during a filling event, the inlet control valve 902 prevents liquid fuel from flowing between the fuel tank 104 and the filler tube 904 as the liquid fuel level in the fuel tank 104 rises and the fuel vapors displace liquid fuel up within the filler tube 904 from the fuel tank 104 toward the inlet 118. The liquid fuel in the second body portion 204 and the biasing element 484 cause the disc 1006 to sealingly engage the seating surface 312 of the valve seat 310. The sealing surface 1004 of the disc 1006 sealingly engages the seating surface 312 to prevent fluid flow through the passageway 806. Thus, when the inlet control valve 902 is in a closed position, the sealing surface 1004 provides a tight seal through the passageway 806, thereby causing fuel vapors, air and/or diurnal emissions to flow through the venting system 908.

Although certain apparatus, methods, and articles of manufacture have been described herein, the scope of coverage of this patent is not limited thereto. To the contrary, this patent covers all apparatus, methods, and articles of manufacture fairly falling within the scope of the appended claims either literally or under the doctrine of equivalents.

What is claimed is:

1. An inlet control valve comprising:

a first body comprising a first opening of a control valve and a first flange opposite the first opening, the first flange comprising fasteners or slots and a first alignment tab;

a second body to be coupled to the first body to define a fluid flow passageway, the second body comprising a second opening of the control valve and a second flange opposite the second opening, the second flange comprising the other of the fasteners or the slots and a second alignment tab, the slots to receive the fasteners when the first body is coupled to the second body, each of the slots extends through the first flange or the second flange along an axis that is substantially parallel to a longitudinal axis of the fluid flow passageway, the first alignment tab and the second alignment tab to facilitate alignment of the fasteners and the slots when the first body is coupled to the second body; and a valve pivotally coupled relative to the first and second bodies to control fluid flow through the fluid flow passageway.

2. The inlet control valve of claim 1, wherein the first body comprises an enlarged portion adjacent the first flange.

3. The inlet control valve of claim 1, wherein the fasteners protrude from the first flange.

4. The inlet control valve of claim 3, wherein the fasteners protrude away from the first flange at an angle relative to the longitudinal axis of the fluid flow passageway.

5. The inlet control valve of claim 1, wherein the second body comprises a valve seat having a seating surface to be engaged by the valve when the inlet control valve is in a closed position.

6. The inlet control valve of claim 5, wherein the valve is to engage the seating surface when the inlet control valve is in the closed position to provide a seal that substantially prevents flow of liquid through the fluid flow passageway between the first opening and the second opening but enables vapors or gas to flow through the fluid flow passageway between the first opening and the second opening.

7. The inlet control valve of claim 5, wherein the valve is to engage the seating surface when the inlet control valve is in the closed position to provide a seal to substantially prevent the flow of liquid, vapors, and gases through the fluid flow passageway between the first opening and the second opening.

8. The inlet control valve of claim 7, wherein the valve is overmolded with a rubber material.

9. The inlet control valve of claim 7, wherein the second body comprises a mount to which the valve is to be coupled, the mount protrudes from a surface of the second body adjacent the fasteners or the slots and opposite an outlet.

10. The inlet control valve of claim 9, wherein the valve comprises a disc mounted to a pivot arm, wherein the pivot arm comprises a Y-shaped cross-sectional shape that includes a body portion to receive the disc and arms extending from the body portion, wherein the arms include tabs having an axis substantially perpendicular to the longitudinal axis of the fluid flow passageway.

11. The inlet control valve of claim 10, wherein the mount comprises a C-shaped channel having slots to receive the tabs of the pivot arm, wherein the tabs engage respective apertures of the slots to enable the pivot arm and the disc to pivot relative to the mount between an open position at which the disc is away from a sealing surface and a closed position at which the disc engages the sealing surface.

12. The inlet control valve of claim 1, wherein the fasteners engage the slots to couple to the first and second bodies via a snap-fit connection.

13. The inlet control valve of claim 1, wherein the first alignment tab protrudes outwardly in a radial direction from the first flange and the second alignment tab protrudes outwardly in a radial direction from the second flange.

14. The inlet control valve of claim 1, wherein the first alignment tab protrudes outwardly from the first flange in a direction away from or perpendicular to the longitudinal axis and the second alignment tab protrudes outwardly from the second flange in a direction away from or perpendicular to the longitudinal axis.

15. An inlet control valve comprising:

a valve;

a first body coupled to a second body to capture the valve between a first opening defined by the first body and a second opening defined by the second body, the first and second bodies defining a passageway between the first opening and the second opening, the first body comprises a first flange comprising a first alignment tab that extends radially, the second body comprises a second flange comprising a second alignment tab that extends radially, the first alignment tab to align with the second alignment tab to facilitate alignment of the first and second bodies when coupling the first and second bodies;

a valve seat disposed within the passageway adjacent an interface of the first body and the second body; and a mount protruding from the second body to pivotally mount the valve relative to the valve seat, the mount to receive a pivot arm of the valve to enable the valve to pivot relative to the valve seat between a first position at which the valve is away from the valve seat and a second position at which the valve engages the valve seat.

16. The inlet control valve of claim 15, wherein the first flange comprises clips protruding therefrom and radially spaced relative to a longitudinal axis of the passageway.

17. The inlet control valve of claim 16, wherein the second flange comprises apertures radially spaced relative to the longitudinal axis of the passageway and to substantially align with and receive the clips when the first body is coupled to the second body.

18. The inlet control valve of claim 17, wherein each of the apertures extends through the second flange along an axis that is substantially parallel to the longitudinal axis of the passageway.

19. The inlet control valve of claim 15, wherein the valve is coupled to the mount prior to coupling the first body and the second body.

20. The inlet control valve of claim 15, wherein the valve seat and the mount are integrally formed with the second body.

21. An inlet control valve comprising:

means for controlling fluid flow between a first opening defined by a first body and a second opening defined by a second body;

means for coupling the first body and the second body via a non-threaded connection to capture the means for controlling fluid flow between the first opening and the second opening, the means for coupling protruding from a first flange of the first body;

means for receiving the means for coupling being defined by a second flange of the second body;

first means for aligning extending from the first flange and second means for aligning extending from the second flange, the first means for aligning having a first periphery defining a first area and second means for aligning having a second periphery defining a second area, the first and second peripheries to align such that the first area overlaps the second area to facilitate alignment of the means for coupling and the means for receiving when coupling the first body and the second body; and means for pivotally mounting the means for controlling fluid flow relative to the first body and second body.

22. The inlet control valve of claim 21, wherein the means for coupling the first and second bodies comprises a snap-fit connection.

23. The inlet control valve of claim 21, wherein the first and second means for aligning protrude outwardly in a radial direction.

* * * * *